United States Patent
Sawada et al.

(10) Patent No.: US 9,937,862 B2
(45) Date of Patent: Apr. 10, 2018

(54) DOOR MIRROR DEVICE FOR VEHICLE

(71) Applicant: HONDA MOTOR CO., LTD., Tokyo (JP)

(72) Inventors: Makoto Sawada, Saitama (JP); Naomi Miyamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 14/902,017

(22) PCT Filed: May 23, 2014

(86) PCT No.: PCT/JP2014/063657
§ 371 (c)(1),
(2) Date: Dec. 30, 2015

(87) PCT Pub. No.: WO2015/001864
PCT Pub. Date: Jan. 8, 2015

(65) Prior Publication Data
US 2017/0001568 A1 Jan. 5, 2017

(30) Foreign Application Priority Data
Jul. 4, 2013 (JP) .................................. 2013-140308

(51) Int. Cl.
*B60R 1/076* (2006.01)
*B60Q 1/26* (2006.01)
(Continued)

(52) U.S. Cl.
CPC ............ *B60R 1/076* (2013.01); *B60Q 1/2696* (2013.01); *B60Q 1/34* (2013.01); *B60R 1/1207* (2013.01)

(58) Field of Classification Search
CPC ........ B60Q 1/2696; B60Q 1/34; B60R 1/076; B60R 1/1207; B60R 1/0617
See application file for complete search history.

(56) References Cited

U.S. PATENT DOCUMENTS 7,229,197 B2 * 6/2007 Tanaka .................. B60R 1/1207
362/459
7,448,781 B2 * 11/2008 Kagawa ............... B60Q 1/2665
362/494

(Continued)

FOREIGN PATENT DOCUMENTS

CN 1468753 1/2004
CN 1621284 6/2005
(Continued)

OTHER PUBLICATIONS

International Search Report dated Jul. 1, 2014, Application No. PCT/JP2014/063657.

(Continued)

*Primary Examiner* — Peggy Neils
(74) *Attorney, Agent, or Firm* — Rankin, Hill & Clark LLP

(57) ABSTRACT

A door mirror device includes a mirror housing mounted to a mirror base, a folding mechanism for enabling the mirror housing to pivot rearward of the vehicle when a load higher than a predetermined value is applied to the mirror housing from the front side of the vehicle. The mirror housing has a first region occupying more than half of the vertical area of the mirror housing and has a second region occupying a less area than the first region. The outer surface of the second region is located in front of the outer surface of the first region. The acute angle in a plan view between the outer surface of the second region and an outer side surface of the vehicle is greater than the acute angle between the outer surface of the first region and the outer side surface of the vehicle.

13 Claims, 12 Drawing Sheets

(51) Int. Cl.
     *B60Q 1/34*    (2006.01)
     *B60R 1/12*    (2006.01)

(56)         References Cited

U.S. PATENT DOCUMENTS 7,914,161 B2 *   3/2011  Horii .................... B60R 1/06
                                                      359/872
    8,491,170 B2 *   7/2013  Rodriguez
                             Barros ............. B60Q 1/2665
                                                      362/494
 2004/0021962 A1     2/2004  Ishigami
 2005/0231970 A1    10/2005  Kagawa
 2007/0047049 A1 *   3/2007  Saitoh ............... B60R 1/1207
                                                      362/494
 2009/0122431 A1     5/2009  Horii et al.

FOREIGN PATENT DOCUMENTS

CN       102463929         5/2012
    JP         61-36036        2/1986
    JP       H08-156687        6/1996
    JP       2001-332316      11/2001
    JP       2004-196298       7/2004
    JP       2005-212755       8/2005
    JP       2005-289302      10/2005
    JP       2009-113753       5/2009

OTHER PUBLICATIONS

Japanese Office Action dated Jul. 5, 2016.
Chinese Office Action dated Sep. 26, 2016, 6 pages.

* cited by examiner

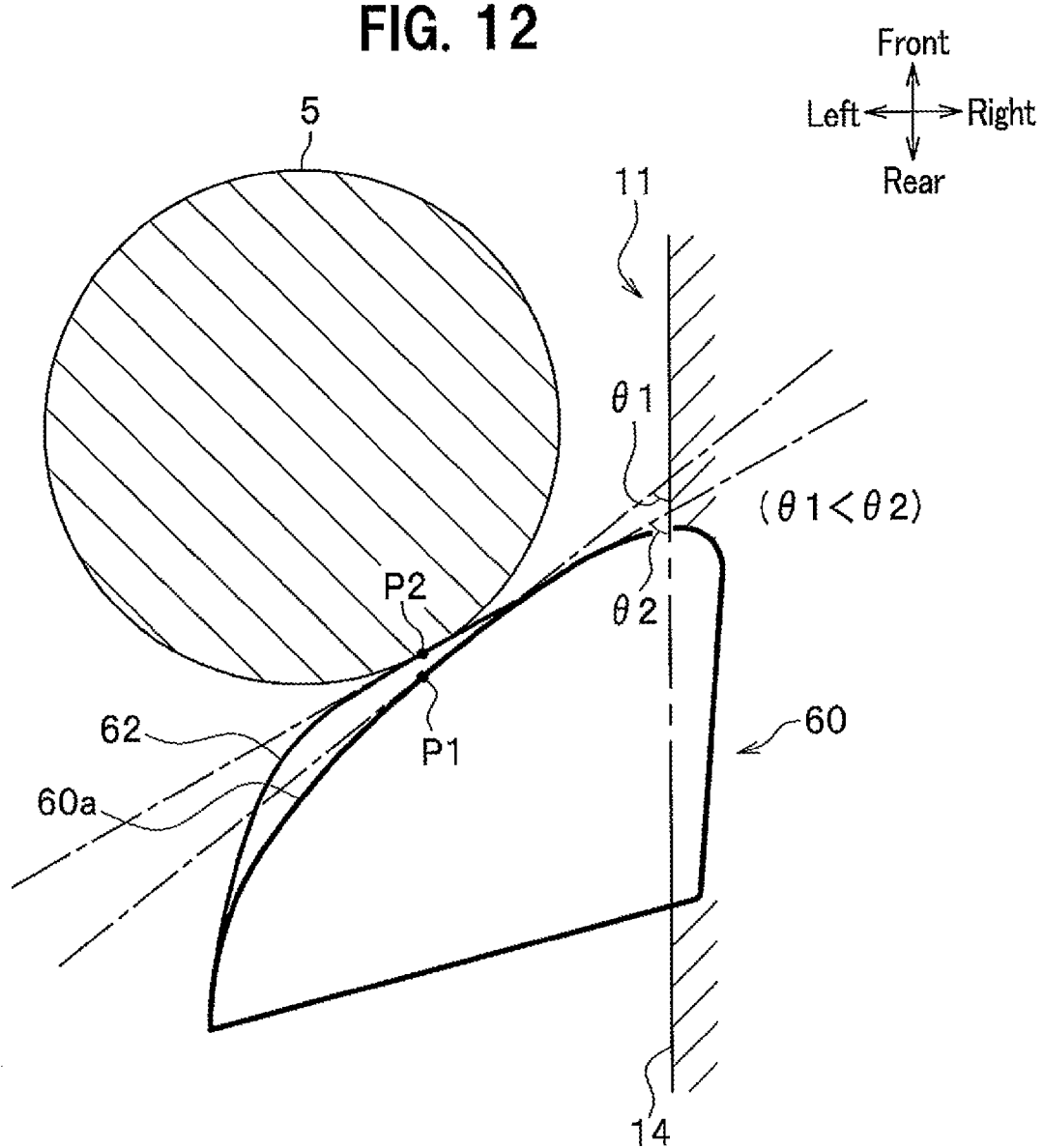

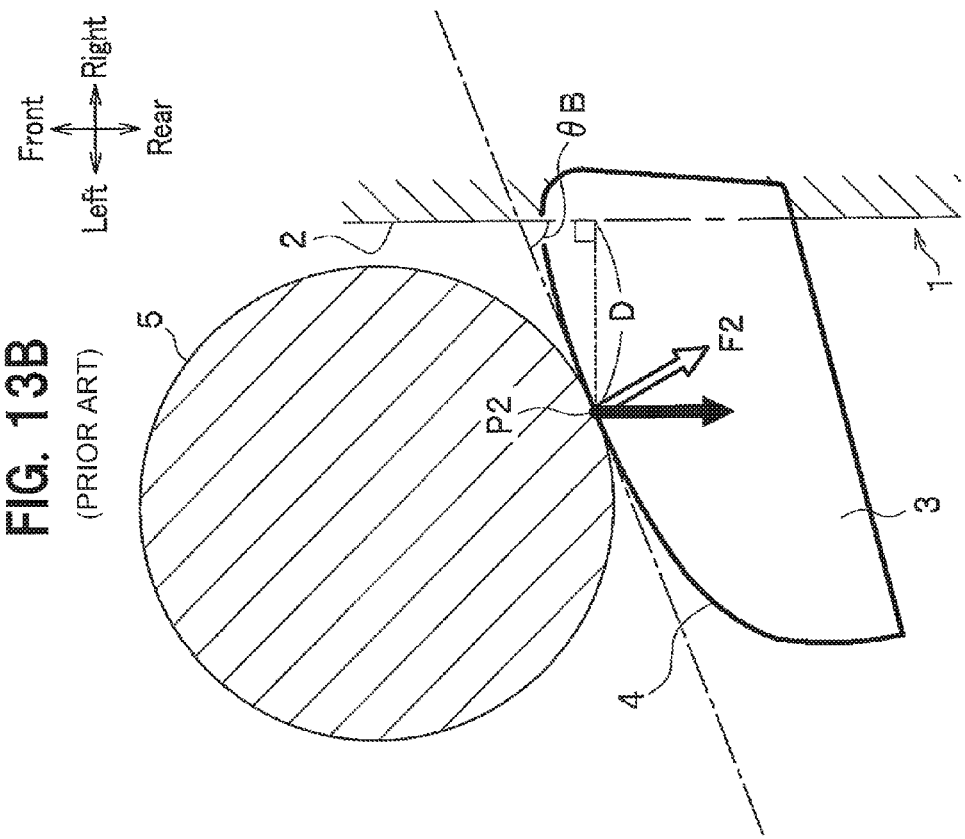
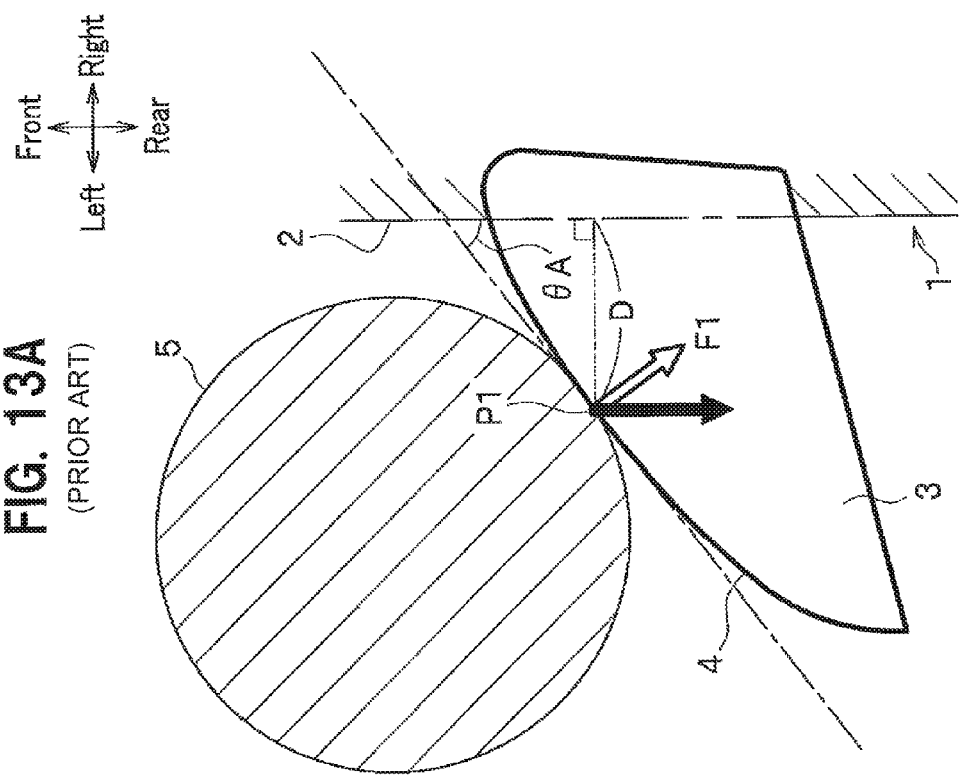

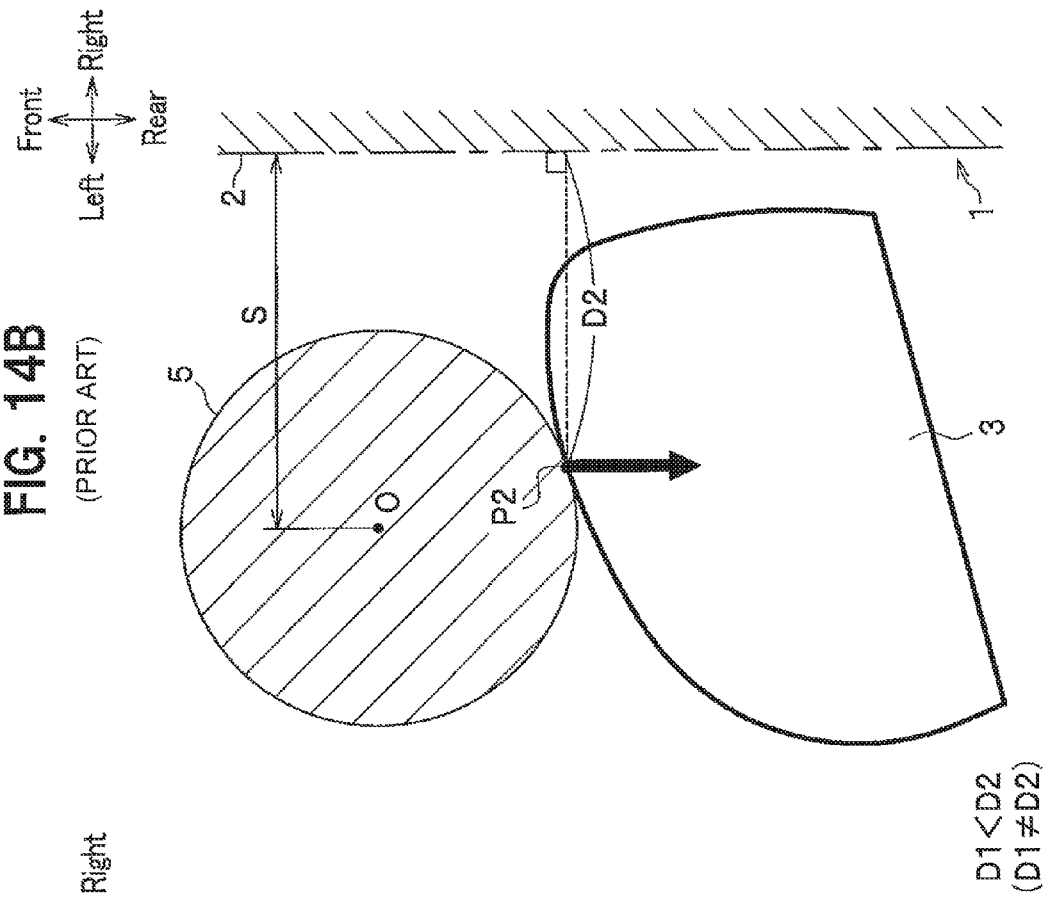
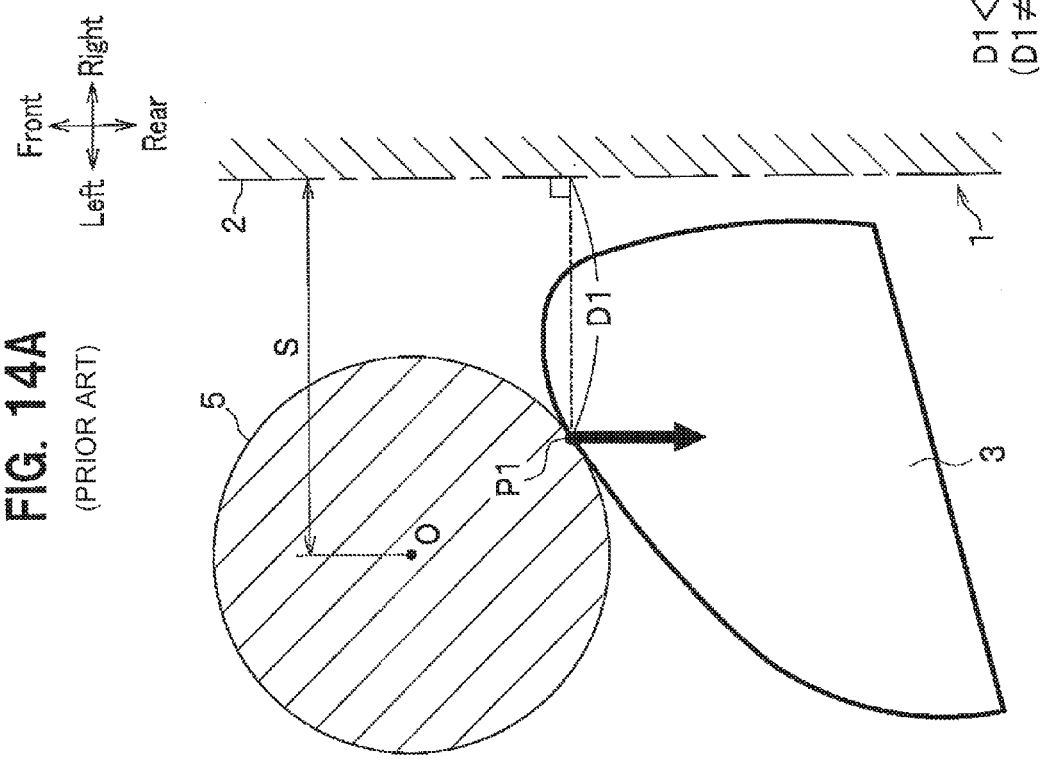
FIG. 14A (PRIOR ART)
FIG. 14B (PRIOR ART)

DOOR MIRROR DEVICE FOR VEHICLE

TECHNICAL FIELD

The present invention relates to a vehicular door mirror device which is attached to, for example, a vehicle body of a car or the like.

BACKGROUND ART

For example, Patent Literature 1 discloses a door mirror device in which a cap and a housing of a door mirror are separately formed, and the cap is attached to the housing in such a manner that the external shape of the cap smoothly continues to the external shape of the housing. Generally, the front side of the housing of the vehicular door mirror is shaped to be more inclined toward the vehicle rear side in portions farther from the vehicle body side in the vehicle width direction.

In the above case, as illustrated in FIGS. 13A and 13B, when the acute angle θA or θB formed between the outer side surface 2 of the vehicle body 1 and the front surface 4 of the housing 3 in plan view in use position of the door mirror is smaller, the air resistance is smaller, and therefore the fuel efficiency and the like are improved. The acute angle θA between the outer side surface 2 of the vehicle body 1 and the front surface 4 of the housing 3 illustrated in FIG. 13A is set smaller than the acute angle θB between the outer side surface 2 and the front surface 4 illustrated in FIG. 13B. (That is, θA<θB.)

In addition, for security reasons, the vehicular door mirror is required to have such a structure that when a collision with an object (obstacle 5) from the vehicle front side occurs, the collision causes the housing 3 to rotate around a rotational axis (not shown) toward the vehicle rear side to a housed position. In FIG. 13B, the points P1 and P2 are the points of collisions between the front surface 4 of the housing 3 and the obstacle 5, and located at a predetermined equal distance D from the outer side surface 2 of the vehicle body 1.

CITATION LIST

Patent Literatures

Patent Literature 1: Japanese Patent Laid-open No. 2004-196298

SUMMARY OF INVENTION

Technical Problem

However, in the case where the acute angle θ formed between the outer side surface 2 of the vehicle body 1 and the front surface 4 of the housing 3 of the door mirror is reduced for improving aerodynamic characteristics, the force component F acting on the housing 3 of the door mirror, which is obtained by vector decomposition of the collision load imposed by the object (obstacle 5) from the vehicle front side, is reduced. In FIGS. 13A and 13B, the force component F1 acting on the housing 3 of the door mirror in the case illustrated in FIG. 13A is smaller than the force component F2 acting on the housing 3 of the door mirror in the case illustrated in FIG. 13B. (That is, F1<F2.)

In other words, when the acute angles θ between the outer side surface 2 of the vehicle body 1 and the front surface 4 of the housing 3 are different, the force components F acting on the housing 3 of the door mirror at the points P1 and P2 of the collisions with the object (obstacle 5) are different. Therefore, when the acute angles θ between the outer side surface 2 of the vehicle body 1 and the front surface 4 of the housing 3 is reduced for improving the aerodynamic characteristics, the housing 3 does not appropriately rotate toward the vehicle rear side, so that the load between the colliding object (obstacle 5) and the housing 3 can increase.

Further, as illustrated in FIGS. 14A and 14B, when the distances S from the outer side surface 2 of the vehicle body 1 to the central point O of the object (obstacle 5) are equal, the distance D1 from the outer side surface 2 of the vehicle body 1 to the point P1 of collision is different from the distance D2 from the outer side surface 2 of the vehicle body 1 to the point P2 of collision. (That is, D1≠D2 and D1<D2.) In addition, the distance from the vehicle body 1 to the rotational axis (not shown) of the housing 3 in the case illustrated in FIG. 14A is smaller than the distance from the vehicle body 1 to the rotational axis (not shown) of the housing 3 in the case illustrated in FIG. 14B. Thus, in the case illustrated in FIG. 14A, the rotational moment of the housing 3 is small, and therefore there is a possibility that the housing 3 may not appropriately rotate.

The general object of the present invention is to provide a vehicular door mirror device which can achieve, in good balance, both of reduction of air resistance and turnability of a door mirror toward the vehicle rear side on collision with an object.

Solution to Problem

In order to achieve the above object, the present invention is characterized in that the vehicular door mirror device is provided with a mirror base which is attached to an outer side surface of a vehicle, a mirror housing which is attached to the mirror base, and a turning mechanism which enables the mirror housing to rotate toward the vehicle rear side when a load corresponding to more than a predetermined value is imposed on the mirror housing from the vehicle front side. In addition, the mirror housing includes a first region which occupies more than half of the extent in the vertical direction in front view of the vehicle, and a second region which occupies a smaller extent than the first region. Further, an outer surface of the second region is located ahead of an outer surface of the first region in the direction toward the vehicle front; and the acute angle formed between the outer surface of the second region and the outer side surface of the vehicle in plan view is set greater than the acute angle formed between the outer surface of the first region and the outer side surface of the vehicle in plan view.

According to the present invention, the acute angle formed between the outer side surface of the vehicle and the first region, which occupies more than half in the vertical direction in front view of the vehicle and has great influence on aerodynamic characteristics, can be set smaller than the acute angle formed between the outer side surface of the vehicle and the second region. Therefore, the air resistance can be reduced. In addition, when an object collides from the vehicle front side, the second region, which has a smaller influence on aerodynamic characteristics than the first region, collides earlier than the first region. Therefore, the force component being caused by the collision load imposed by the object and acting on the mirror housing can be enhanced. Consequently, according to the present invention, it is possible to achieve, in good balance, both of reduction of air resistance and turnability of the door mirror toward the vehicle rear side on collision with an object.

An additional feature of the present invention is that the mirror housing includes a base member connected to the turning mechanism, and a cap member attached to the base member; the first region is arranged in the cap member; and the second region is arranged in the base member.

According to the present invention, the second region is arranged in the base member, which is connected to the turning mechanism. Therefore, the collision load can be effectively transmitted from the base member to the turning mechanism, so that the mirror housing can be turned with high reliability. In addition, the first region is arranged in the cap member, which is formed separately from the base member. Therefore, the external shape of the first region can be easily changed according to figure design, aerodynamic design, or the like, so that the freedom of product development, design change, and the like increases.

The meaning of the expression "the base member connected to the turning mechanism" includes the case in which the base member is directly connected to the turning mechanism, and the case in which the base member is indirectly connected to the turning mechanism, for example, through a bracket connected to the turning mechanism.

An additional feature of the present invention is that a transparent protruding member is attached to the mirror housing, and the second region is arranged in the protruding member.

Since the second region is arranged in the transparent protruding member according to the present invention, harmful influence on design can be suppressed even in the case where the protruding member has a shape adapted for the turning load.

An additional feature of the present invention is that the vehicular door mirror device according to the present invention is further provided with a light guide which is housed in part inside the mirror housing and is exposed in the remaining part to outside of the mirror housing, a light element is arranged inside the mirror housing, and the protruding member is the light guide, which guides light entering a portion of the light guide to the outside of the mirror housing and emits the light.

According to the present invention, the protruding member can be used as the light guide. Therefore, the number of parts and the manufacturing cost can be reduced. In addition, since the light element cannot be externally visually recognized while the protruding member does not emit light, the product appearance can be improved.

An additional feature of the present invention is that the second region is arranged in the entire region extending in the vehicle width direction from the position in which the turning mechanism is arranged to the outermost edge of the mirror base.

According to the present invention, the second region is arranged in the entire region extending in the vehicle width direction from the position in which the turning mechanism is arranged to the outermost edge of the mirror base. Therefore, the mirror housing can be smoothly rotated (turned) at whatever position on the second region an object collides.

An additional feature of the present invention is that the first region is arranged on a coated surface, and the second region is arranged on an uncoated surface.

According to the present invention, the second region is arranged on the uncoated surface, the unevenness of which is relatively inconspicuous. Therefore, it is possible to form the mirror housing to have an external shape appropriate for the turning load while suppressing harmful influence on design. In addition, both of the product appearance and the aerodynamic characteristics can be improved because the coated surface, which has great influence on design, becomes the first region, which occupies more than half.

Advantageous Effect of Invention

According to the present invention, it is possible to obtain a door mirror device which can achieve, in good balance, both of reduction of air resistance and turnability of a door mirror toward the vehicle rear side on collision with an object.

BRIEF DESCRIPTION OF THE DRAWINGS

FIG. 12 is a plan view illustrating a scene in which an object collides with a protruding member of the door mirror device illustrated in FIG. 11A.

FIGS. 13A and 13B are diagrams presented for explanation and illustrate relationships between air resistance and turnability, toward the vehicle rear side, of door mirrors on collision with an object according to a conventional technique.

FIGS. 14A and 14B are diagrams presented for explaining a relationship with the rotational moment of the door mirror according to a conventional technique in the cases where the distance from the outer side surface of the vehicle body to an object is unchanged.

DESCRIPTION OF EMBODIMENTS

Figure 1:
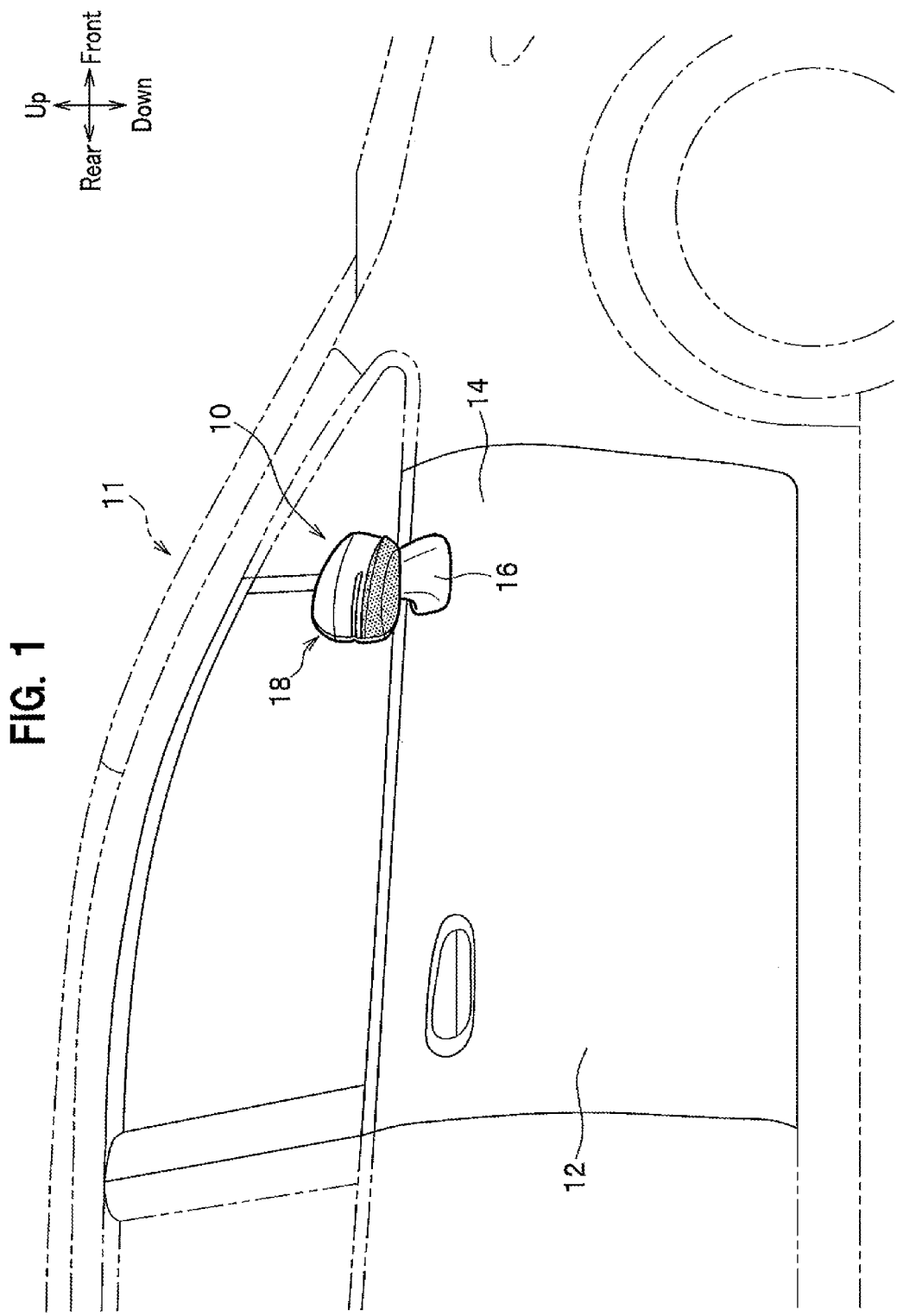
FIG. 1 is a partial side view of a vehicle in which a door mirror device according to an embodiment of the present invention is used.
Figure 4:
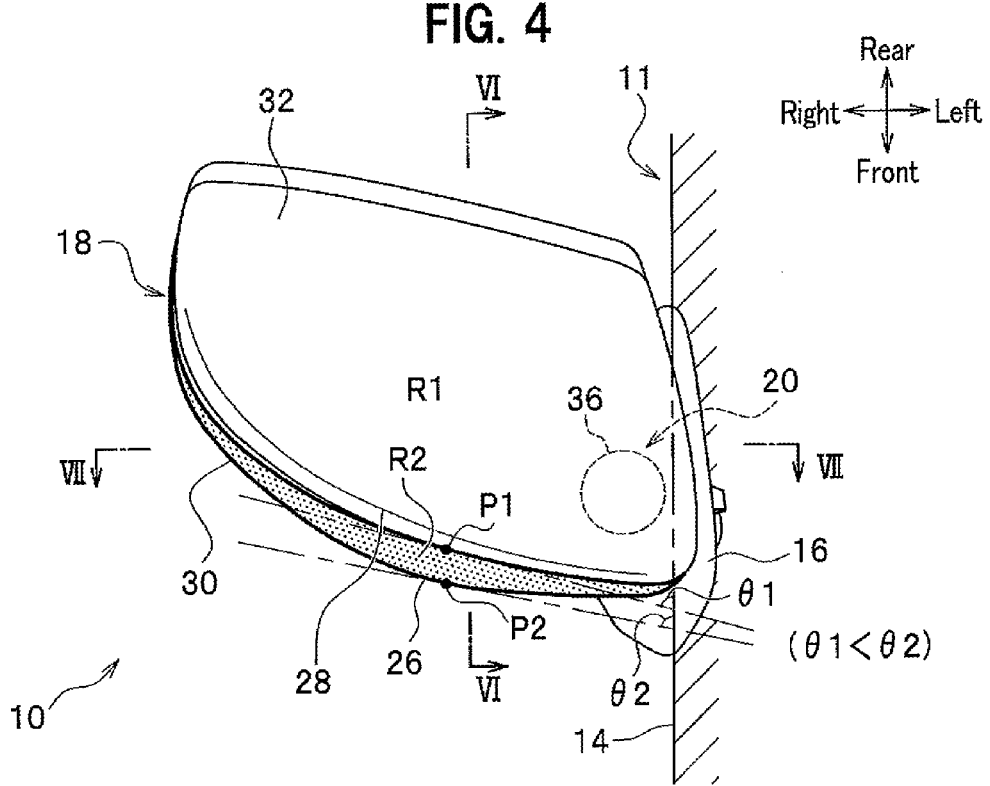
FIG. 4 is a plan view of the door mirror device illustrated in FIG. 2.
Figure 5:
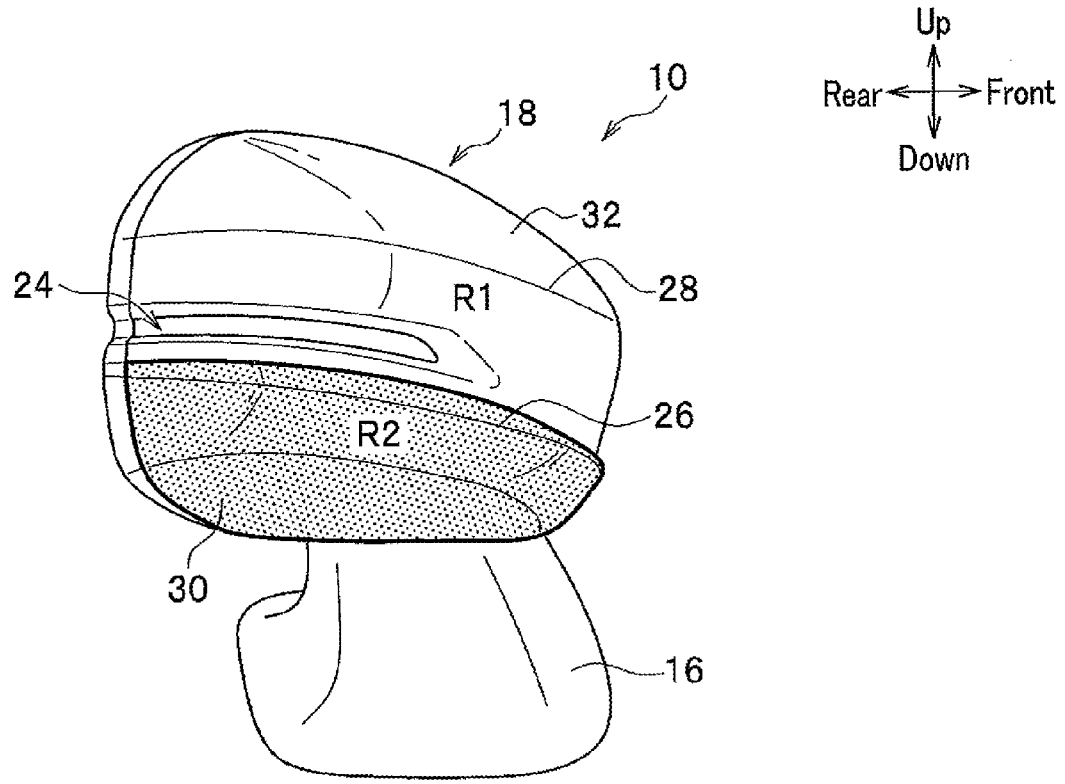
FIG. 5 is a view of the door mirror device illustrated in FIG. 3 from the direction indicated by the arrow Z.
Figure 6:
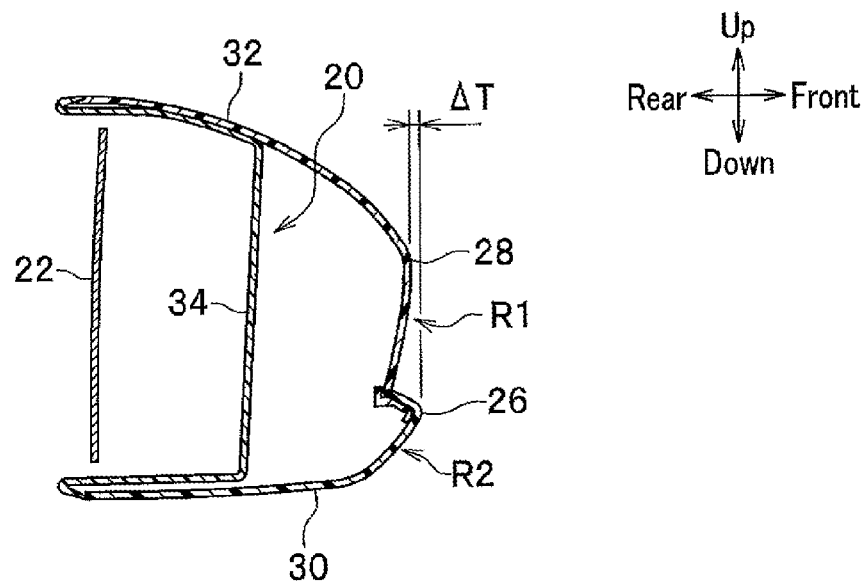
FIG. 6 is an end face view of the door mirror device illustrated in FIG. 4 along the line VI-VI.
Figure 7:
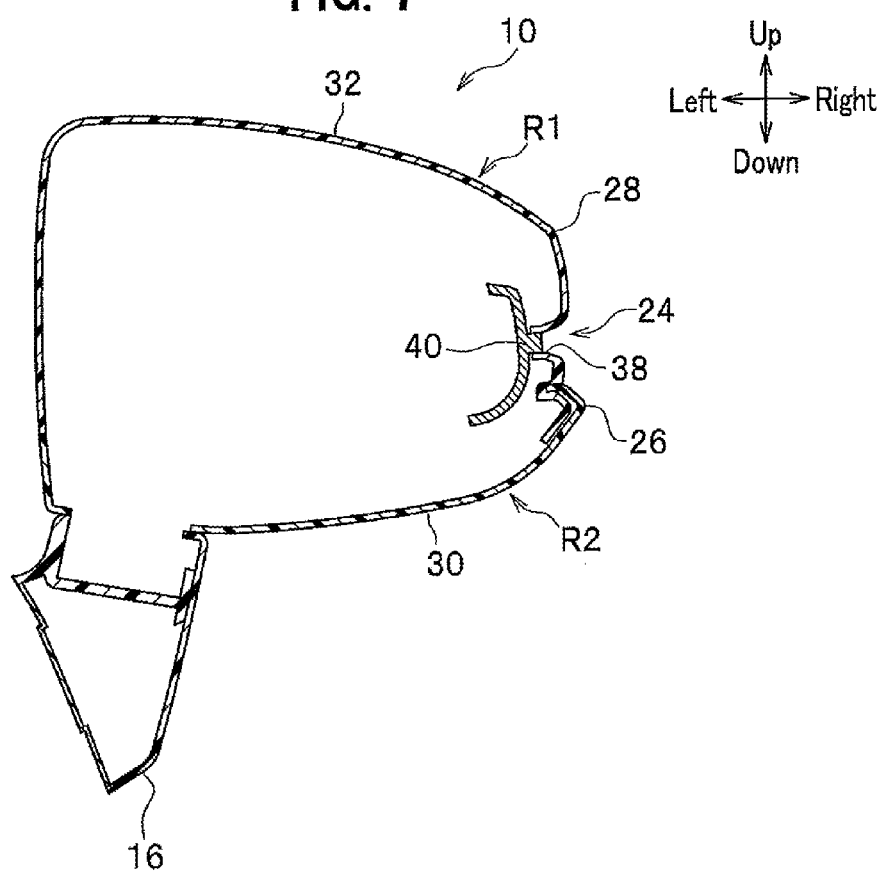
FIG. 7 is an end face view of the door mirror device illustrated in FIG. 4 along the line VII-VII.

Hereinbelow, an embodiment of the present invention is explained in detail with reference to the drawings when necessary. FIG. 1 is a partial side view of a vehicle in which a door mirror device according to the embodiment of the present invention is used, FIG. 2 is a perspective view of the door mirror device illustrated in FIG. 1, FIG. 3 is a front view of the door mirror device illustrated in FIG. 2, FIG. 4 is a plan view of the door mirror device illustrated in FIG. 2, FIG. 5 is a view of the door mirror device illustrated in FIG. 3 from the direction indicated by the arrow Z, FIG. 6 is an end face view of the door mirror device illustrated in FIG. 4 along the line VI-VI, and FIG. 7 is an end face view of the door mirror device illustrated in FIG. 4 along the line VII-VII.

As illustrated in FIG. 1, the door mirror device 10 according to the embodiment of the present invention is applied to a door mirror which enables the driver to view the vehicle rear side (rear lateral side) of the vehicle 11.

The door mirror devices 10 is attached to the outer side surface 14 of each of the right and left front doors 12 on the driver seat side and the front passenger a s seat side. As the present embodiment of the present invention, the door mirror device 10 attached to the outer side surface 14 of the right front door 12 is explained below, and the door mirror device 10 attached to the outer side surface 14 of the left front door 12 is not explained.

Figure 2:
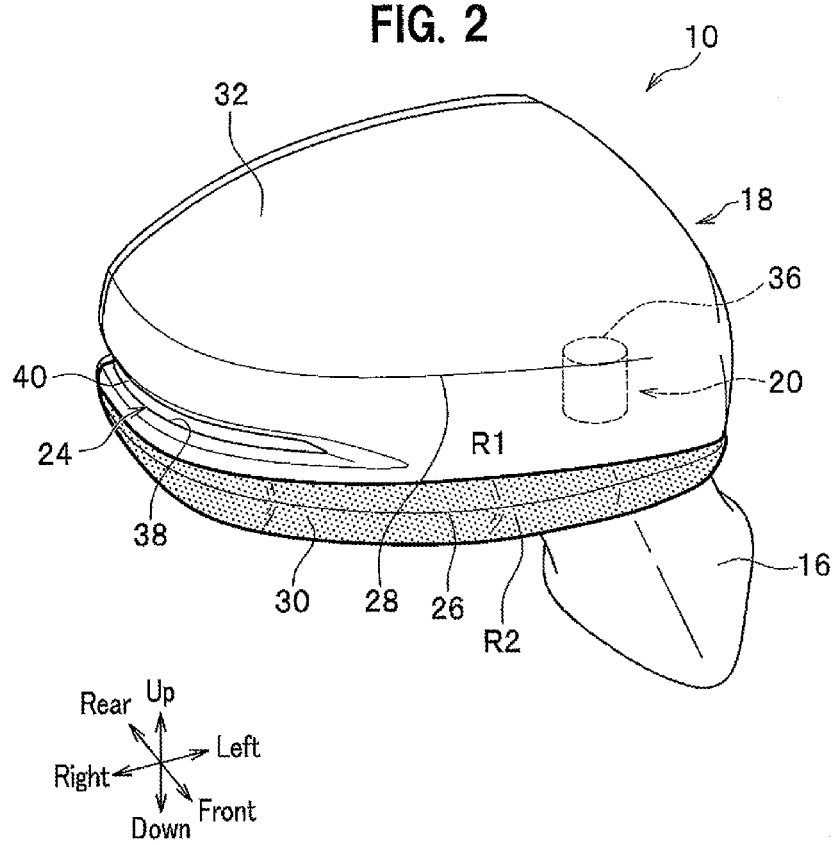
FIG. 2 is a perspective view of the door mirror device illustrated in FIG. 1.
Figure 3:
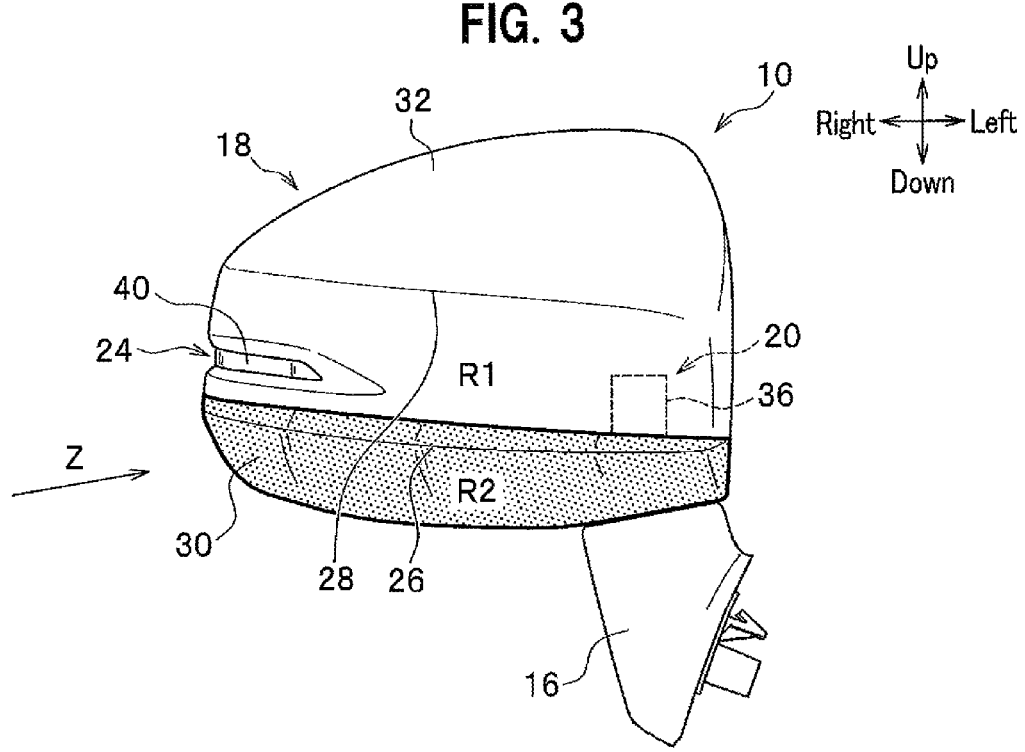
FIG. 3 is a front view of the door mirror device illustrated in FIG. 2.

As illustrated in FIGS. 2 and 3, the door mirror device 10 is constituted by a mirror base 16, a mirror housing 18, a turning mechanism 20, a mirror 22, and for example, a direction indicator 24. The mirror base 16 is attached to the outer side surface 14 of the right front door 12. The mirror housing 18 is attached to the mirror base 16. The turning mechanism 20 enables the mirror housing 18 to rotate to the vehicle rear side when a load corresponding to a predetermined value or more is imposed on the mirror housing 18 from the vehicle front side. The mirror 22 (illustrated in FIG. 6) is arranged in the mirror housing 18 and enables visual recognition of the scene on the vehicle rear side. The direction indicator 24 displays a turn signal and the like.

The mirror housing 18 is supported in such a manner that the mirror housing 18 can turn to three positions of a possible front turn position, a use position, and a housed position (possible rear turn position). The possible front turn position is the position to which the mirror housing 18 can rotate from the use position in the direction toward the vehicle front side for impact buffering, for example, when the mirror housing 18 collides with an obstacle while the vehicle moves backward. In addition, the use position is the position at which the mirror housing 18 is normally used. The housed position (possible rear turn position) is the position to which the mirror housing 18 can turn (rotate) from the use position in the direction toward the vehicle rear side for buffering impact, for example, when the mirror housing 18 collides with an obstacle while the vehicle moves forward.

The mirror housing 18 is shaped to be more inclined toward the vehicle rear side in portions farther from the vehicle body side in the vehicle width direction (the right-left direction). In addition, the mirror housing 18 includes a first region R1 (the unhatched portion) and a second region R2 (the hatched portion), which are ranged in the vertical direction. The first region R1 occupies more than half of the surface area viewed from the vehicle front side, and the second region R2 occupies an extent (surface area) smaller than the first region R1.

The outer surface 26 of the second region R2, which is a portion of the second region R2 located forwardmost in the front-rear direction of the vehicle, protrudes by a predetermined length in the horizontal direction from the outer surface 28 of the first region R1, which is a portion of the first region R1 located forwardmost in the front-rear direction of the vehicle. That is, as illustrated in FIG. 6, the outer surface 26 of the second region R2 is located the length ΔT ahead of the outer surface 28 of the first region R1 in the front-rear direction of the vehicle.

In addition, as illustrated in FIG. 4, the acute angle θ2 formed in plan view between the outer surface 26 of the second region R2 and the outer side surface 14 of the vehicle body is set greater than the acute angle θ1 formed in plan view between the outer surface 28 of the first region R1 and the outer side surface 14 of the vehicle body (i.e., θ1<θ2). In other words, the acute angle θ2 formed between the outer side surface 14 of the vehicle body and the tangential line passing through a collision point P2 at which the outer surface 26 of the second region R2 first comes into contact with an obstacle 5 is set greater than the acute angle θ1 formed between the outer side surface 14 of the vehicle body and the tangential line passing through a collision point P1 at which the outer surface 28 of the first region R1 is assumed to first come into contact with the obstacle 5 (i.e., θ1<θ2). As in the cases illustrated in FIG. 13, the collision points P1 and P2 are equally distant by a predetermined distance from the outer side surface 14 of the vehicle 11. Although the obstacle 5 does not actually come into contact at the collision point P1 as explained later, the collision point P1 is illustrated for convenience in explanation on the tangential line at the acute angle θ1.

Alternatively, for example, the acute angle θ2 formed between the outer side surface 14 of the vehicle body and the tangential line passing through a point, located forwardmost in the front-rear direction of the vehicle, on the outer surface 26 of the second region R2 may be set greater than the acute angle θ1 formed between the outer side surface 14 of the vehicle body and the tangential line passing through a point, located forwardmost in the front-rear direction of the vehicle, on the outer surface 28 of the first region R1 (i.e., θ1<θ2).

Further, as illustrated in FIGS. 2 and 3, the second region R2 is arranged in the entire region extending in the vehicle width direction from the innermost edge, on the vehicle interior side, of the mirror base 16 to the outermost edge of the mirror base 16 and including the position of a shaft portion 36 which constitutes the turning mechanism 20. In addition, it is possible to arrange the first region R1 on a coated surface, which is an outer surface of the mirror housing 18 coated with paint, and arrange the second region R2 on an uncoated surface, which is an outer surface of the mirror housing 18 not coated with paint.

The mirror housing 18 includes a base member 30, a cap member 32, and a bracket 34. The base member 30 is connected to the turning mechanism 20, the cap member 32 is attached to the base member 30, and the bracket 34 is housed inside the cap member 32. (See FIG. 6 for the bracket 34.) The base member 30, the cap member 32, and the bracket 34 are formed of, for example, resin material. The first region R1 is arranged in the cap member 32, and the second region R2 is arranged in the base member 30. The base member 30 may be connected to the turning mechanism 20 directly, or indirectly through the bracket 34, which is connected to the turning mechanism 20.

The turning mechanism 20 includes the shaft portion 36 (illustrated in FIG. 2), an overriding recess (not shown), and an override projection (not shown). The mirror housing 18 can turn around the shaft portion 36, and the overriding recess and the override projection are arranged on the base member 30 and the bracket 34. In this case, the mirror housing 18 can turn from the use position to the housed position or the possible front turn position when the overriding recess overrides the override projection.

As illustrated in FIG. 7, the direction indicator 24 includes a transparent or opaque member 40 and a light source (not shown). The transparent or opaque member 40 is arranged at a slit 38 in the cap member 32.

Figure 8:
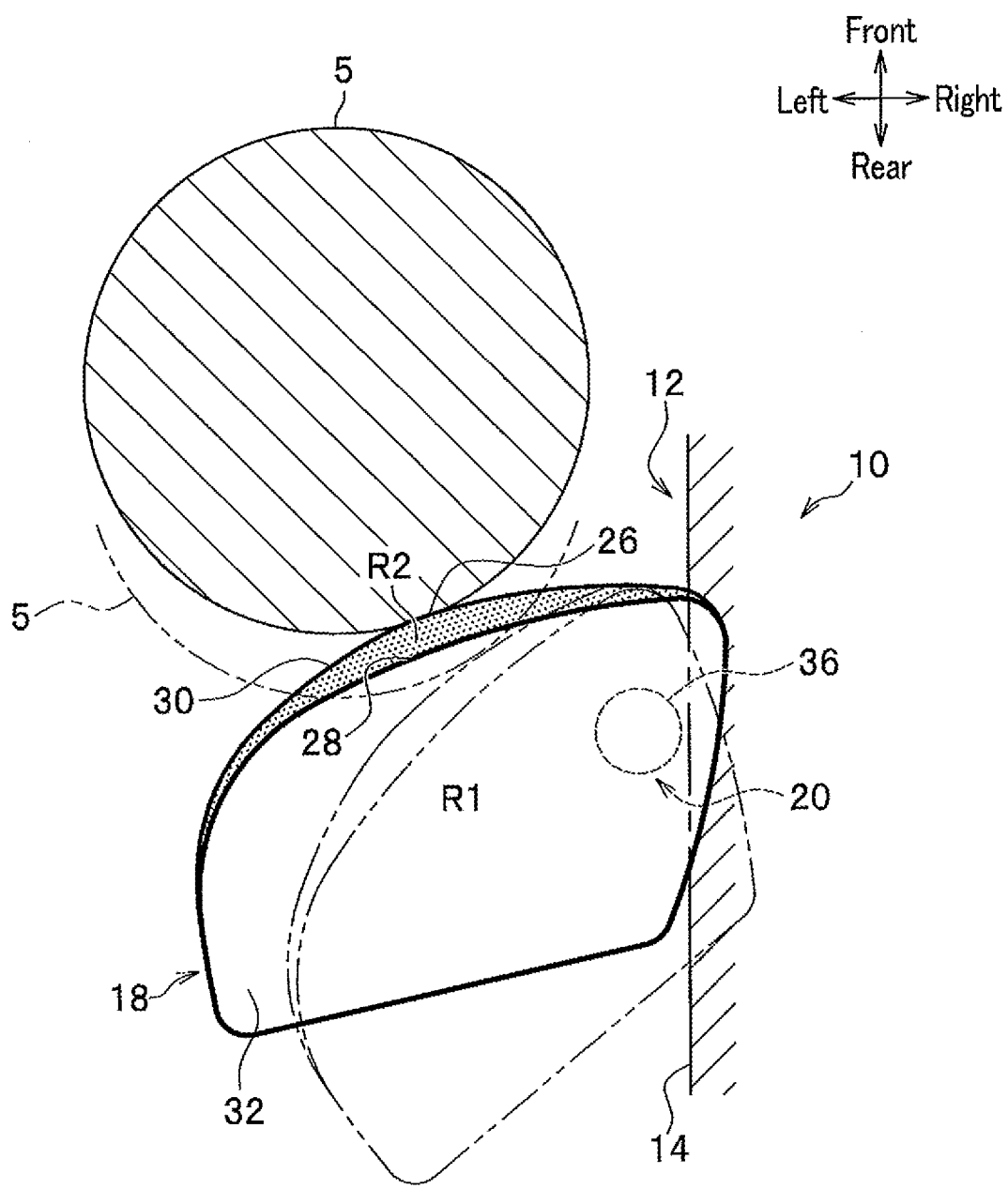
FIG. 8 is a diagram presented for explanation on turnability on collision of an object with a mirror housing.

The door mirror device 10 according to the present embodiment is basically constituted as above. Next, operations and effects of the present embodiment are explained below. FIG. 8 is a diagram presented for explanation on turnability on collision of an object with a mirror housing. In FIG. 8, for convenience, the door mirror device 10 attached to the outer side surface 14 of the left front door 12 on the driver side of the vehicle body is illustrated.

In the present embodiment, as illustrated in FIG. 4, the acute angle formed between the outer side surface 14 of the vehicle body 11 and the first region R1, which occupies more than half in the vertical direction and has great influence on the aerodynamic characteristics, can be set small in comparison with the acute angle formed with the second region R2 (i.e., θ1<θ2). Therefore, the air resistance can be reduced. In addition, according to the present embodiment, as illustrated in FIG. 8, when a collision with an object (obstacle 5) from the vehicle front side occurs, the second region R2, which has small influence on the aerodynamic characteristics, collides with the object earlier than the first region R1. Therefore, the force component being caused by the collision load imposed by the object (obstacle 5) and acting on the mirror housing 18 can be enhanced by the second region R2. Consequently, according to the present embodiment, both of reduction of air resistance and turnability of the mirror housing 18 (door mirror) toward the vehicle rear side on collision with an object can be achieved in good balance.

Further, since the base member 30 connected to the turning mechanism 20 is arranged in the present embodiment, the collision load can be effectively transmitted from the base member 30 to the turning mechanism 20, so that the mirror housing 18 can be turned with high reliability. Furthermore, since the first region R1 is arranged in the cap member 32, which is separately formed from the base member 30, the external shape of the first region R1 can be easily changed according to figure design, aerodynamic design, and the like, so that the freedom of product development, design change, and the like increases.

Moreover, in the present embodiment, the second region R2 is arranged in the entire region extending in the vehicle width direction from the innermost edge, on the vehicle interior side, of the mirror base 16 to the outermost edge of the mirror base 16 and including the position of the shaft portion 36 which constitutes the turning mechanism 20. Therefore, according to the present embodiment, for example, when a collision with an object from the vehicle front side occurs, the mirror housing 18 can be smoothly rotated (turned) at whatever position on the second region R2 the object collides, because the second region R2 is arranged in the entire region in which the colliding object can cause rotation of the turning mechanism 20 around the shaft portion 36 as a rotation center.

Further, in the present embodiment, in the case where the second region R2 is arranged on the uncoated surface, on which unevenness is relatively inconspicuous, the second region R2 can be formed to have a profile appropriate for the rotatable load while suppressing harmful influence on design. In addition, both of product appearance and aerodynamic characteristics can be improved because the first region R1, which occupies more than half, is arranged on the coated surface, which has great influence on design.

Furthermore, in the present embodiment, when a collision with an object (obstacle 5) from the vehicle front side occurs, the second region R2 collides with the object earlier than the first region R1. Therefore, only the point P2 becomes a point of collision with the object (obstacle 5). In this case, the distance between the collision point P2 and the central point of the shaft portion 36 of the turning mechanism 20 is greater than the distance between the collision point P1 and the central point of the shaft portion 36 of the turning mechanism 20. Therefore, for example, even when the force being caused by a collision load imposed by the object (obstacle 5) and acting on the mirror housing 18 is assumed to be unchanged, the rotational moment of the mirror housing 18 around the shaft portion 36 as a rotation center can be set great.

Figure 9:
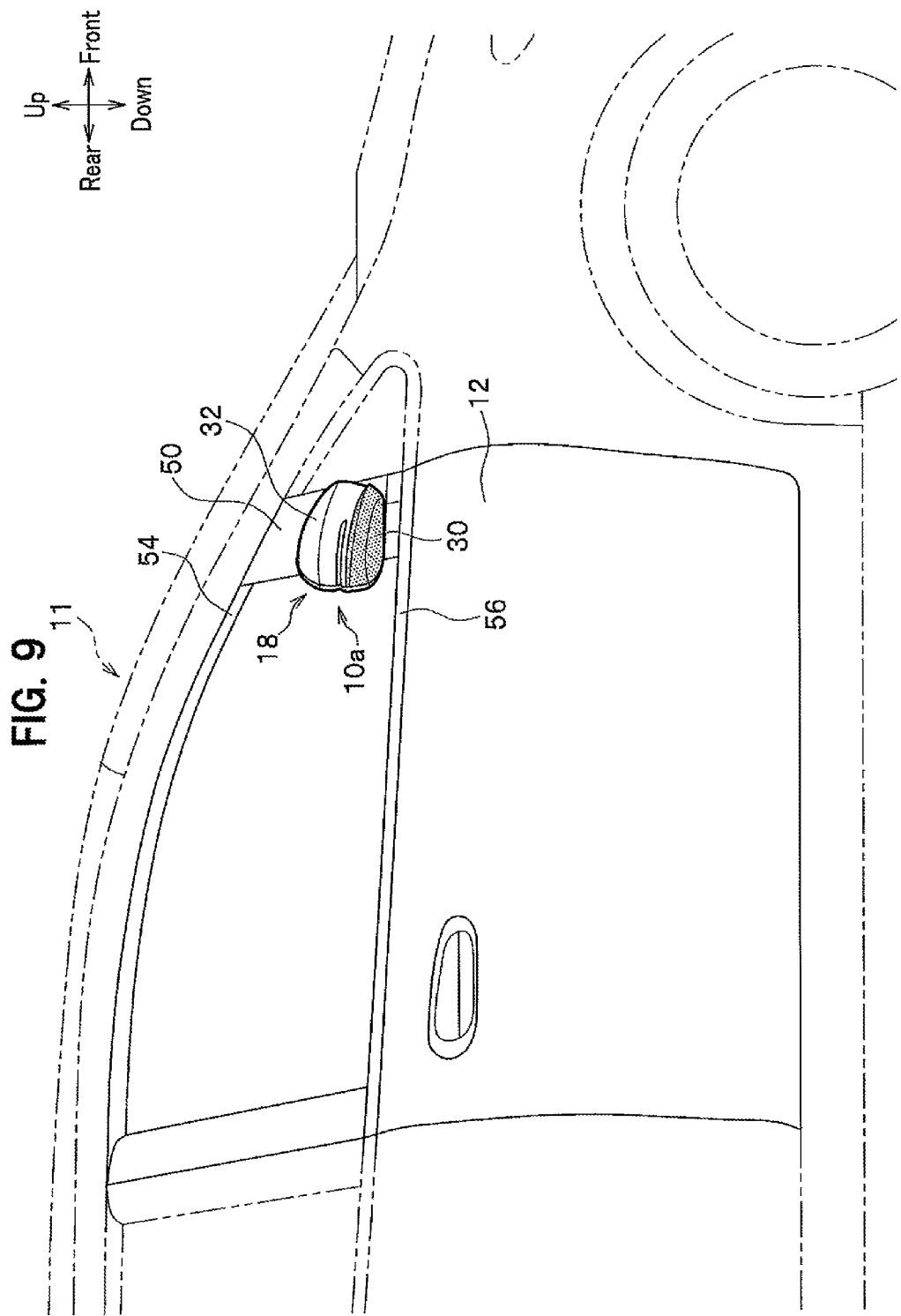
FIG. 9 is a partial side view of a vehicle in which a door mirror device according to another embodiment of the present invention is used.
Figure 10:
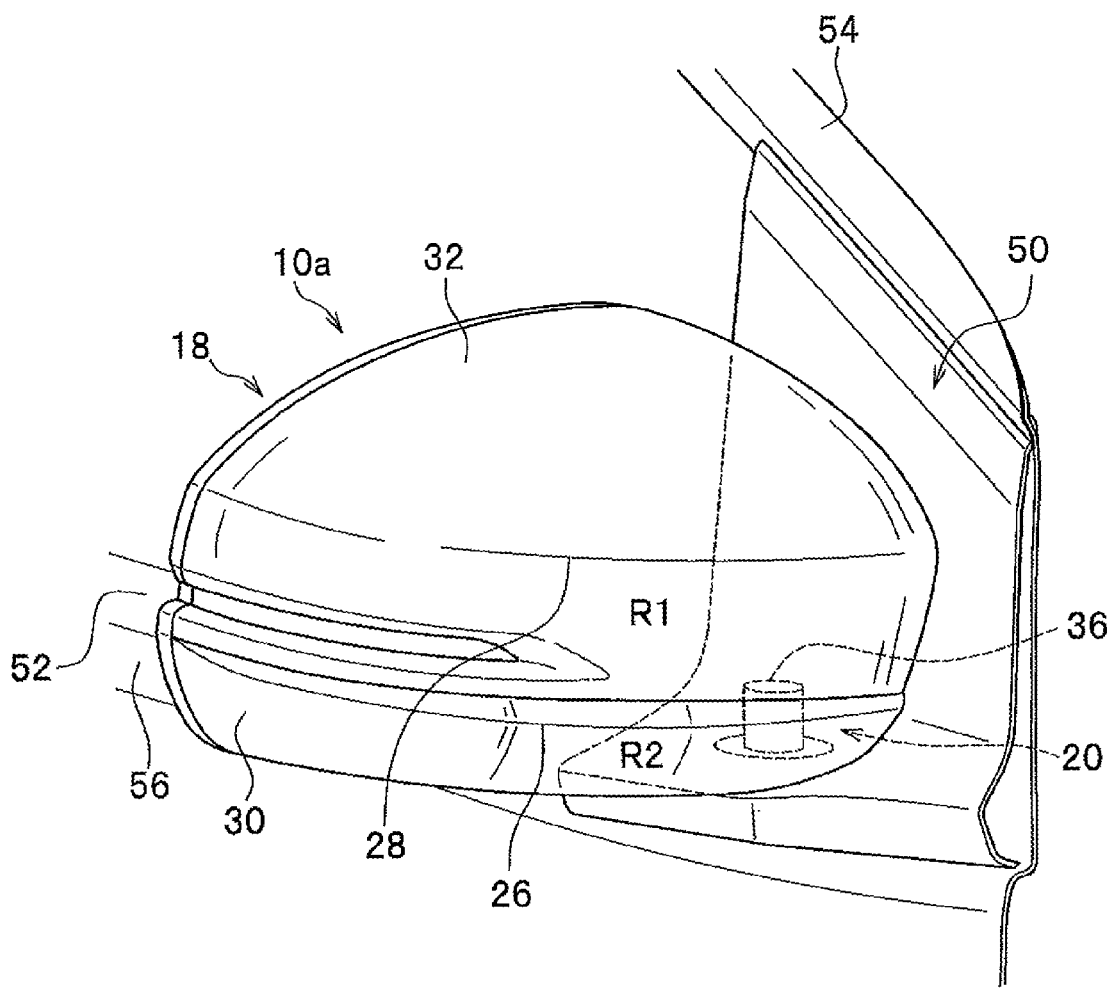
FIG. 10 is a perspective view of the door mirror device illustrated in FIG. 9.

Next, a door mirror device 10a according to another embodiment of the present invention is explained below. FIG. 9 is a partial side view of a vehicle in which the door mirror device according to the other embodiment of the present invention is used, and FIG. 10 is a perspective view of the door mirror device illustrated in FIG. 9. In the following explanations on the other embodiment, the same constituent elements as in the embodiment explained before bear the same reference numbers, and the detailed explanations on the same constituent elements are not repeated.

In the door mirror device 10a according to the other embodiment, the mirror base 50 has a shape different from the mirror base in the embodiment explained before, although the mirror housing 18 has the same shape as the embodiment explained before. The mirror base 50 has a plate-like shape with a large width, and is attached to a position near a corner portion between a door waist 52 and a door sash 54. The mirror base 50 is fixed to the door sash 54.

Figure 11A:
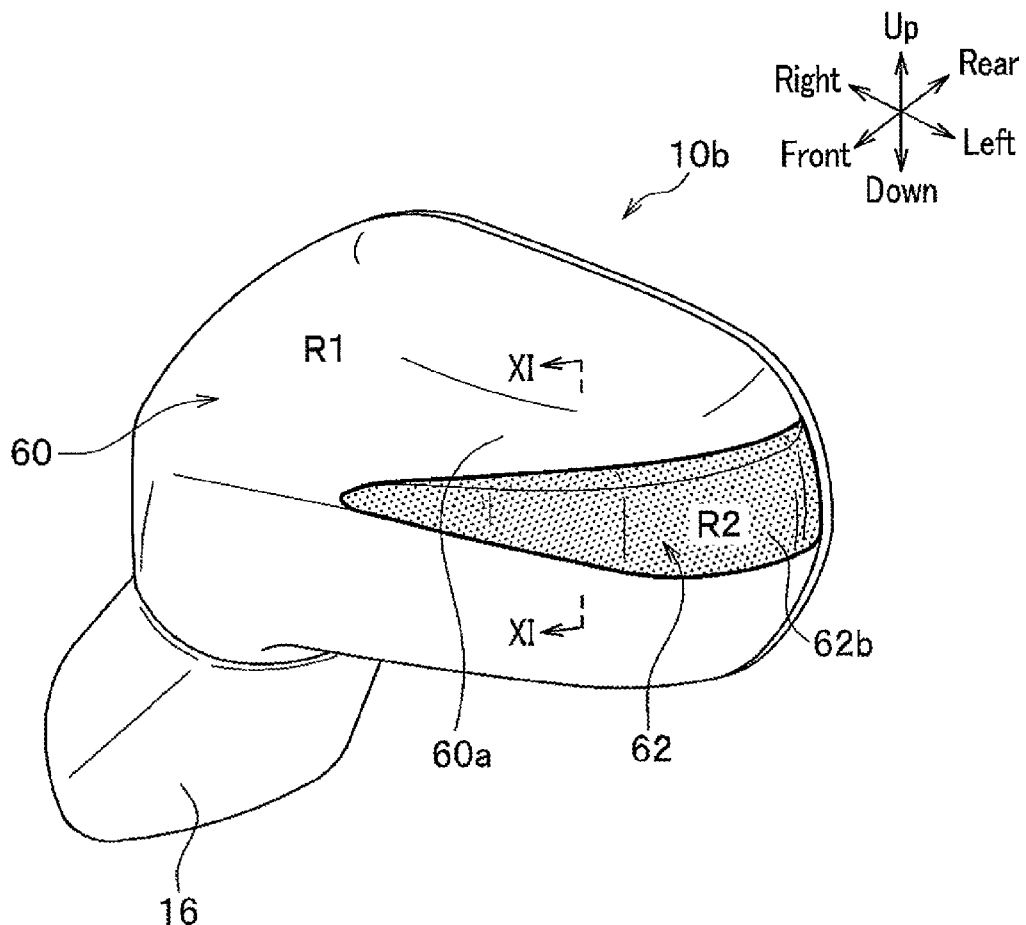
FIG. 11A is a perspective view of a door mirror device according to a further embodiment of the present invention.

Next, a door mirror device 10b according to a further embodiment of the present invention is explained below. FIG. 11A is a perspective view of the door mirror device according to the further embodiment of the present invention, FIG. 11B is a longitudinal cross-sectional view along the line XI-XI indicated in FIG. 11A, and FIG. 12 is a plan view illustrating a scene in which an object collides with a protruding member of the door mirror device illustrated in FIG. 11A.

The door mirror device 10b according to the further embodiment is different from the embodiments explained before in that the protruding member 62, which protrudes outward by a predetermined length, is fitted onto a portion of a mirror housing 60 and the second region R2 is arranged in the protruding member 62. The protruding member 62 is formed of, for example, a transparent resin material.

As illustrated in FIG. 12, the protruding member 62 is arranged to protrude forward from an upper outer surface 60a of the mirror housing 60 in the front-rear direction of the vehicle in plan view. That is, the protruding member 62 is arranged such that when collision with an object (obstacle 5) from the vehicle front side occurs, the second region R2, which is realized by the protruding member 62 having little influence on aerodynamic characteristics, collides with the object earlier than the first region R1, which is the upper outer surface 60a.

Figure 11B:
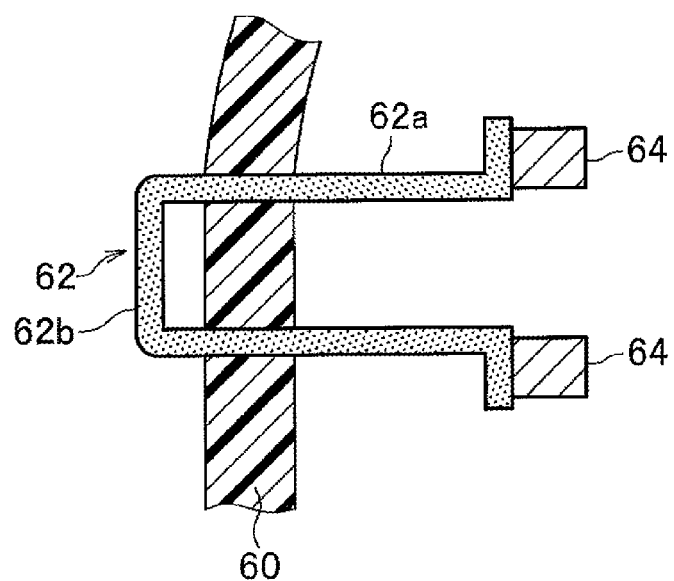
FIG. 11B is a longitudinal cross-sectional view along the line XI-XI indicated in FIG. 11A.

More specifically, as illustrated in FIG. 11B, the protruding member 62 is arranged such that a portion 62a of the protruding member 62 is housed inside the mirror housing 60, and the remaining portion (externally protruding portion) 62b functions as a light guide which is exposed to the outside of the mirror housing 60. A light element 64, for example, an LED is arranged inside the mirror housing 60 in such a manner that the light from the light element 64 which enters a portion of the light guide is guided to the outside of the mirror housing 60 and emitted.

In the present embodiment, the second region R2 is arranged in the transparent protruding member 62. Therefore, even in the case where the protruding member 62 has an external shape adapted for the turning load, harmful influence on design can be suppressed.

In addition, according to the present embodiment, the protruding member 62 can be used as a light guide. Therefore, the number of parts can be reduced, so that the manufacturing cost can be suppressed. Further, when the protruding member 62 does not emit light, the light element 64 cannot be visually recognized from outside. Therefore, the product appearance can be improved.

Since the other operations and effects of the above embodiment are the same as those of the door mirror device 10 illustrated in FIG. 2, detailed explanations on the other operations and effects of the above embodiment are not repeated.

LIST OF REFERENCE SIGNS 10, 10a, 10b: Door Mirror Device
11: Vehicle
14: Outer Side Surface
16: Mirror Base
18, 60: Mirror Housing
20: Turning Mechanism
26: Outer Surface (Second Region)
28: Outer Surface (First Region)
30: Base Member
32: Cap Member
62: Protruding Member (Transparent Material)
64: Light Element
R1: First Region
R2: Second Region
θ1, θ2: Acute Angle

The invention claimed is:

1. A vehicular door mirror device comprising:
a mirror base which is attached to an outer side surface of a vehicle;
a mirror housing which is attached to the mirror base; and
a turning mechanism which enables the mirror housing to rotate toward a vehicle rear side when a load corresponding to more than a predetermined value is imposed on the mirror housing from a vehicle front side;
wherein the mirror housing includes,
a first region which occupies more than half in a vertical direction in front view of the vehicle, and
a second region which occupies a smaller extent than the first region;
an outer surface of the second region is located ahead of an outer surface of the first region in a direction toward a vehicle front; and
an acute angle formed between the outer surface of the second region and the outer side surface of the vehicle in plan view is set greater than an acute angle formed between the outer surface of the first region and the outer side surface of the vehicle in plan view.

2. The vehicular door mirror device according to claim 1, wherein the mirror housing includes,
a base member connected to the turning mechanism, and
a cap member attached to the base member;
the first region is arranged in the cap member; and
the second region is arranged in the base member.

3. The vehicular door mirror device according to claim 1, wherein a transparent protruding member is attached to the mirror housing, and the second region is arranged in the protruding member.

4. The vehicular door mirror device according to claim 3, further comprising a light guide which is housed in part inside the mirror housing, and is exposed in a remaining part to outside of the mirror housing, wherein a light element is arranged inside the mirror housing, and the protruding member is the light guide, which guides light entering a portion of the light guide to outside of the mirror housing and emits the light.

5. The vehicular door mirror device according to claim 1, wherein the second region is arranged in an entire region extending in a vehicle width direction from a position in which the turning mechanism is arranged to an outermost edge of the mirror base.

6. The vehicular door mirror device according claim 1, wherein the first region is arranged on a coated surface, and the second region is arranged on an uncoated surface.

7. The vehicular door mirror device according claim 2, wherein the first region is arranged on a coated surface, and the second region is arranged on an uncoated surface.

8. The vehicular door mirror device according claim 3, wherein the first region is arranged on a coated surface, and the second region is arranged on an uncoated surface.

9. The vehicular door mirror device according claim 4, wherein the first region is arranged on a coated surface, and the second region is arranged on an uncoated surface.

10. The vehicular door mirror device according claim 5, wherein the first region is arranged on a coated surface, and the second region is arranged on an uncoated surface.

11. A vehicular door mirror device comprising:
a mirror base which is attached to an outer side surface of a vehicle;
a mirror housing which is attached to the mirror base; and
a turning mechanism which enables the mirror housing to rotate toward a vehicle rear side when a load corresponding to more than a predetermined value is imposed on the mirror housing from a vehicle front side;
wherein the mirror housing includes,
a first region which occupies more than half in a vertical direction in front view of the vehicle, and
a second region which occupies a smaller extent than the first region;
an outer surface of the second region is located ahead of an outer surface of the first region in a direction toward a vehicle front; and
an acute angle formed between the outer surface of the second region and the outer side surface of the vehicle in plan view is set greater than an acute angle formed between the outer surface of the first region and the outer side surface of the vehicle in plan view;
wherein a transparent protruding member is attached to the mirror housing, and the second region is arranged in the protruding member.

12. The vehicular door mirror device according to claim 11, further comprising a light guide which is housed in part inside the mirror housing, and is exposed in a remaining part to outside of the mirror housing, wherein a light element is arranged inside the mirror housing, and the protruding member is the light guide, which guides light entering a portion of the light guide to outside of the mirror housing and emits the light.

13. The vehicular door mirror device according claim 11, wherein the first region is arranged on a coated surface, and the second region is arranged on an uncoated surface.

* * * * *